US011517103B2

(12) United States Patent
Choi

(10) Patent No.: US 11,517,103 B2
(45) Date of Patent: Dec. 6, 2022

(54) BELT HOLDER FOR TAPE MEASURE

(71) Applicant: Jun Young Choi, Seoul (KR)

(72) Inventor: Jun Young Choi, Seoul (KR)

( * ) Notice: Subject to any disclaimer, the term of this patent is extended or adjusted under 35 U.S.C. 154(b) by 31 days.

(21) Appl. No.: 17/293,312

(22) PCT Filed: Nov. 12, 2019

(86) PCT No.: PCT/KR2019/015341
§ 371 (c)(1),
(2) Date: May 12, 2021

(87) PCT Pub. No.: WO2020/105932
PCT Pub. Date: May 28, 2020

(65) Prior Publication Data
US 2022/0007823 A1 Jan. 13, 2022

(30) Foreign Application Priority Data

Nov. 19, 2018 (KR) .......................... 10-2018-0142238
Oct. 30, 2019 (KR) .......................... 10-2019-0136190

(51) Int. Cl.
*A45F 5/02* (2006.01)
*G01B 3/1041* (2020.01)

(52) U.S. Cl.
CPC ............ *A45F 5/021* (2013.01); *G01B 3/1041* (2013.01); *A45F 2200/0575* (2013.01)

(58) Field of Classification Search
CPC .... A45F 5/021; A45F 5/02; A45F 2200/0575; A45F 2005/025; G01B 3/1041; G01B 3/1071; G01B 2003/1074; Y10S 224/904; B25H 3/006; B25H 3/00

USPC .................................................. 224/667, 904
See application file for complete search history.

(56) References Cited

U.S. PATENT DOCUMENTS

| 5,906,031 A * | 5/1999 | Jensen ...................... A45F 5/02 24/3.12 |
| 6,233,788 B1 * | 5/2001 | Choy ........................ A45F 5/02 24/669 |
| 6,752,299 B2 * | 6/2004 | Shetler .................. F41C 33/045 24/3.11 |
| 6,786,372 B2 * | 9/2004 | Enkerlin ................... A45F 5/02 455/100 |
| 7,409,237 B2 * | 8/2008 | Tages ....................... A45F 5/02 455/575.1 |
| 10,182,641 B1 | 1/2019 | Goodman |

(Continued)

FOREIGN PATENT DOCUMENTS

| JP | 3163381 U | 10/2010 |
| JP | 6210675 B2 | 10/2017 |

(Continued)

OTHER PUBLICATIONS

International Search Report for PCT/KR2019/015341 dated Mar. 3, 2020 from Korean Intellectual Property Office.

*Primary Examiner* — Adam J Waggenspack
(74) *Attorney, Agent, or Firm* — Paratus Law Group, PLLC

(57) ABSTRACT

Disclosed is a belt holder for a tape measure, including: a holder body configured to be mounted on the belt; a rotary mount rotatably coupled to a front surface of the holder body; a locking bracket provided at the holder body or the rotary mount; and a restoring spring elastically supporting the locking bracket in one direction.

6 Claims, 16 Drawing Sheets

(56) References Cited

U.S. PATENT DOCUMENTS

| | | | |
|---|---|---|---|
| 10,470,556 B1* | 11/2019 | Choi | G01B 3/1041 |
| 2007/0039989 A1* | 2/2007 | Nistico | F41H 9/10 |
| | | | 224/245 |
| 2008/0283563 A1 | 11/2008 | O'Donnell et al. | |
| 2012/0260513 A1 | 10/2012 | Daugherty et al. | |
| 2016/0102805 A1* | 4/2016 | Khodapanah | F16M 13/022 |
| | | | 248/224.8 |

FOREIGN PATENT DOCUMENTS

| | | |
|---|---|---|
| JP | 3217935 U | 9/2018 |
| KR | 10-0760086 B1 | 9/2007 |
| KR | 20-0460225 Y1 | 5/2012 |

\* cited by examiner

BELT HOLDER FOR TAPE MEASURE

CROSS-REFERENCE TO PRIOR APPLICATIONS

This application is a National Stage Patent Application of PCT International Patent Application No. PCT/KR2019/015341 (filed on Nov. 12, 2019) under 35 U.S.C. § 371, which claims priority to Korean Patent Application Nos. 10-2018-0142238 (filed on Nov. 19, 2018) and 10-2019-0136190 (filed on Oct. 30, 2019), which are all hereby incorporated by reference in their entirety.

BACKGROUND

The present disclosure relates to a belt holder and, more particularly, to a belt holder for a tape measure, that is mounted on a belt to hold a tape measure by hanging the tape measure.

A tape measure enables a worker to easily measure a distance longer than the worker's arms and is very convenient to carry, so tape measures are generally used in construction sites.

Since tape measures are frequently used in construction sites, they are hung on a belt to be carried. Tape measures have a belt clip to be able to be easily carried in this way.

A common belt holder for a tape measure has a type in which a holder body that is mounted on a belt and a mount that has a clip hole being open up and down, in which the belt clip of a tape measure is inserted, to hang the tape measure are integrated. When a worker mounts a tape measure by hanging the belt clip of the tape measure on the mount of such a common belt holder for a tape measure, the worker can freely use both hands and can conveniently separate and use the tape measure from a belt at any time if the tape measure is needed.

However, when a tape measure is mounted using such a common belt holder for a tape measure, there is a problem that the tape measure is easily separated from the belt holder for a belt when the worker excessively moves.

Meanwhile, as a completely different type from the common belt holder for a tape measure, a specific type of belt holder for a tape measure which locks a tape measure when the tape measure is inserted in the belt holders and prevents separation of the tape measure unless a specific unlocking device is operated has been frequently developed and sold.

Since when a user only mounts a tape measure on the specific type of belt holder for a tape measure, the tape measure is maintained in the locked state, thus there is an advantage that a tape measure is not separated from the belt holder even though the user excessively moves or an external force is applied.

However, the specific type of belt holder for a tape measure has a problem that it is troublesome to have to unlock a tape measure by operating the locking device even though performing work not having the possibility of causing separation of the tape measure and a tape measure has to be equipped with an exclusive bracket suitable for the specific type of belt holder for a tape measure.

SUMMARY

The present disclosure has been made in an effort to solve the problems of the related art and an objective of the present disclosure is to provide a belt holder for a tape measure that can easily mount tape measures having a belt clip of the related art and enables selective use of a mounting mode in which a tape measure can be easily mounted and separated even without specific operation and a locking mode in which a tape measure is not separated without specific operation.

In order to achieve the objectives, a belt holder for a tape measure which is mounted on a belt to hold the tape measure having a belt clip by hanging the tape measure includes: a holder body configured to be mounted on the belt; a rotary mount having a clip hole formed in an up-down direction in which the belt clip of the tape measure is inserted to hang the tape measure, rotatably coupled to a front surface of the holder body, and being able to change into a posture for a mounting mode in which the rotary mount is vertically upright with respect to the holder body and a posture for a locking mode in which the rotary mount is rotated from the posture for the mounting mode; a locking bracket having a locking jaw preventing separation of the belt clip from the clip hole, and provided at the holder body or the rotary mount such that the locking jaw can reciprocate between a position where the locking jaw prevents separation of the belt clip and a position where the locking jaw does not prevent separation of the belt clip; and a restoring spring elastically supporting the locking bracket in one direction such that the locking jaw of the locking bracket is positioned at the position where the locking jaw prevents separation of the belt clip and the position where the locking jaw does not prevent separation of the belt clip, in which the belt holder can be used in the mounting mode in which the rotary mount is in the posture for the mounting mode and the belt clip of the tape measure can be inserted into the clip hole or can be freely taken out of the clip hole and in the locking mode in which the rotary mount is in the posture for the locking mode and the locking jaw is positioned over the clip hole.

The locking bracket may be rotatably disposed at the rotary mount; the restoring spring may elastically support the locking bracket such that the locking jaw of the locking bracket is positioned at the position where the locking jaw does not prevent separation of the belt clip; and a locking bracket rotation portion rotating the locking bracket such that the locking jaw of the locking bracket is moved to the position where the locking jaw prevents separation of the belt clip when the rotary mount is changed into the posture for the locking mode from the posture for the mounting mode may be further provided.

The locking bracket may have a locking bracket body having a first side where the locking jaw is formed and another side rotatably coupled to the rotary mount, and a sliding protrusion protruding toward the holder body from the locking bracket body; the locking bracket rotation portion may be a guide slope formed at the holder body, extending along a movement path of the sliding protrusion when the rotary mount is changed into the posture for the locking mode from the posture for the mounting mode, and protruding at a slope toward the sliding protrusion; and the sliding protrusion of the locking bracket may keep in contact with the guide slope by the restoring spring.

A locking bracket hole for inward and outward movement of the locking bracket may be formed over the clip hole of the rotary mount; and the locking bracket may be positioned inside the rotary mount without protruding outward in the mounting mode, and the locking jaw of the locking bracket may protrude through the locking bracket hole and is positioned over the clip hole in the locking mode.

The holder body and the rotary mount may be combined to be able to rotate about a rotary shaft positioned at centers of the holder body and the rotary mount; the rotary mount may have a posture-fixing plate spring having an end fixed to the rotary mount and another end where a locking protrusion is formed; and the holder body may have a posture-fixing plate spring stopper formed in cylindrical shape surrounding the rotary shaft and having, on an outer surface thereof, a first locking groove in which the locking protrusion is inserted to elastically fix the rotary mount to the holder body when the rotary mount is in the posture for the mounting mode, a second locking groove in which the locking protrusion is inserted to elastically fix the rotary mount to the holder body when the rotary mount is in the posture for the locking mode, and a locking protrusion guide surface extending between the first locking groove and the second locking groove to guide movement of the locking protrusion.

A first anti-rotation step restricting movement of the locking protrusion may be formed opposite to the locking protrusion guide surface of the first locking groove, and a second anti-rotation step restricting movement of the locking protrusion may be formed opposite to the locking protrusion guide surface of the second locking groove.

The locking bracket may be slidably disposed on the holder body and the restoring spring may elastically support the locking bracket in one direction such that the locking jaw of the locking bracket is positioned at the position where the locking jaw prevents separation of the belt clip.

The holder body may further have a releaser sliding the locking bracket to the position where the locking jaw of the locking bracket does not prevent separation of the belt clip.

Any one of the holder body and the rotary mount may have a spring protrusion and the other one of the holder body and the rotary mount may have a plurality of protrusion grooves in which the spring protrusion is inserted to elastically fix the rotary mount in the posture for the mounting mode or the posture for the locking mode.

A pair of clip fixing plate springs for holding and fixing left and right sides of the belt clip inserted in the clip hole may be further disposed in the rotary mount.

The belt holder for a tape measure of the present disclosure can be selectively used in the mounting mode in which a user can vertically erect the rotary mount and then insert the belt clip of the tape measure into the clip hole or take the belt clip of the tape measure out of the clip hole at any time and the locking mode in which the user can rotate the rotary mount from the vertical state such that the tape measure is locked to the belt holder for the tape measure and the belt clip of the tape measure cannot be separated from the rotary mount.

That is, it is possible to simply mount and easily separate and use a tape measure without specific operation when performing simple work without a possibility of separation of the tape measure and it is possible to safely carry the tape measure by mounting the tape measure in the locked state when performing difficult work with a possibility of separation of the tape measure.

Further, according to the present disclosure, unlike specific types of belt holders for a tape measure of the related art, it is possible to easily mount tape measures as long as the tape measures have common belt clips of the related art.

DETAILED DESCRIPTION

Figure 1:
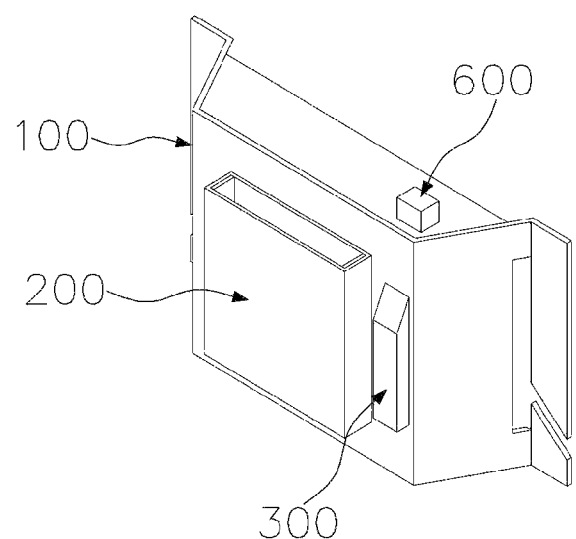
FIG. 1 is a perspective view of a belt holder for a tape measure according to a first embodiment of the present disclosure.

Embodiments of the present disclosure are described hereafter with reference to the accompanying drawings for those skilled in the art to be able to easily achieve the present disclosure. However, the present disclosure may be modified in various different ways and is not limited to the embodiments described herein. Further, in the accompanying drawings, components irrelevant to the description will be omitted in order to obviously describe the present disclosure, and similar reference numerals will be used to describe similar components throughout the specification. Through the present specification, unless explicitly described otherwise, "comprising" any components will be understood to imply the inclusion of other components rather than the exclusion of any other components.

Hereafter, a first embodiment according to the present disclosure is described.

Figure 2:
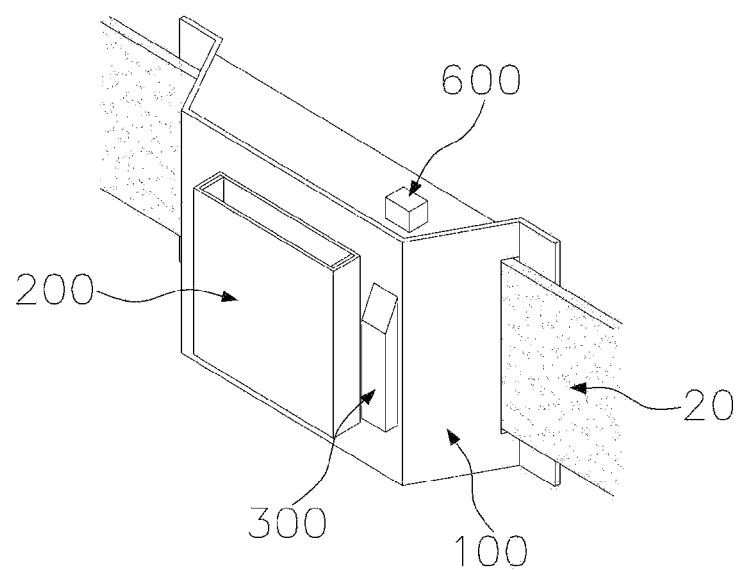
FIG. 2 is a view showing the state when the belt holder for a tape measure of FIG. 1 has been mounted on a belt.
Figure 3:
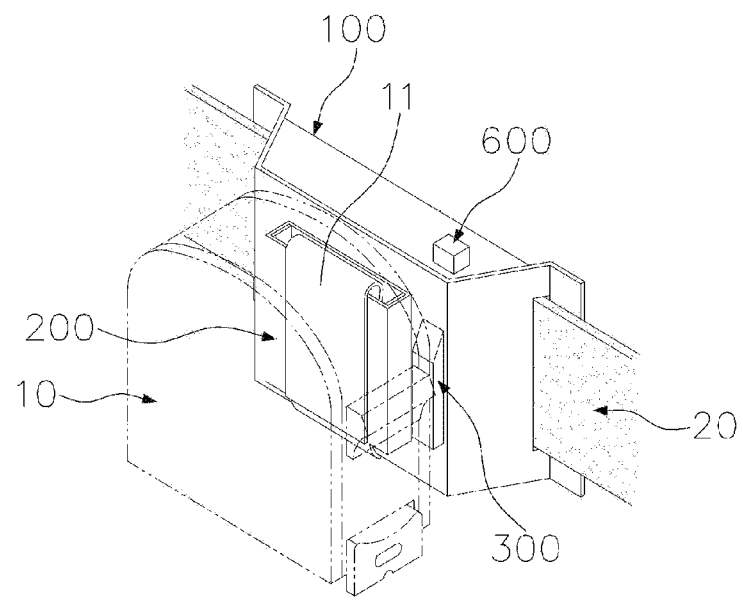
FIG. 3 is a view showing the state when a tape measure has been mounted on the belt holder for a tape measure of FIG. 2.
Figure 4:
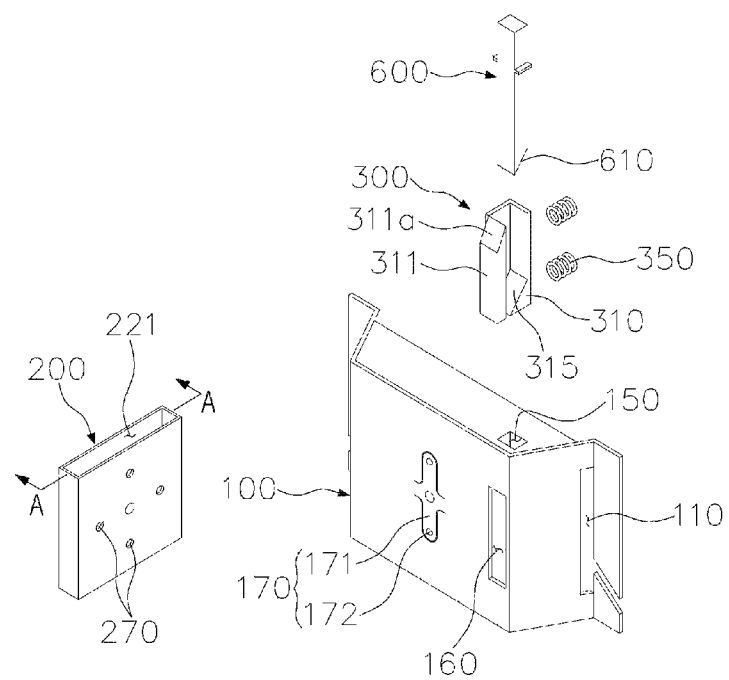
FIG. 4 is a view showing the belt holder for a tape measure of FIG. 1 with a rotary mount separated.
Figure 5:
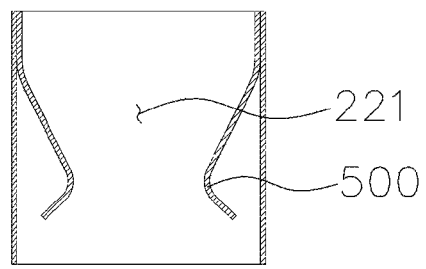
FIG. 5 is a cross-sectional view of the rotary mount of FIG. 4 taken along line A-A.
Figure 6:
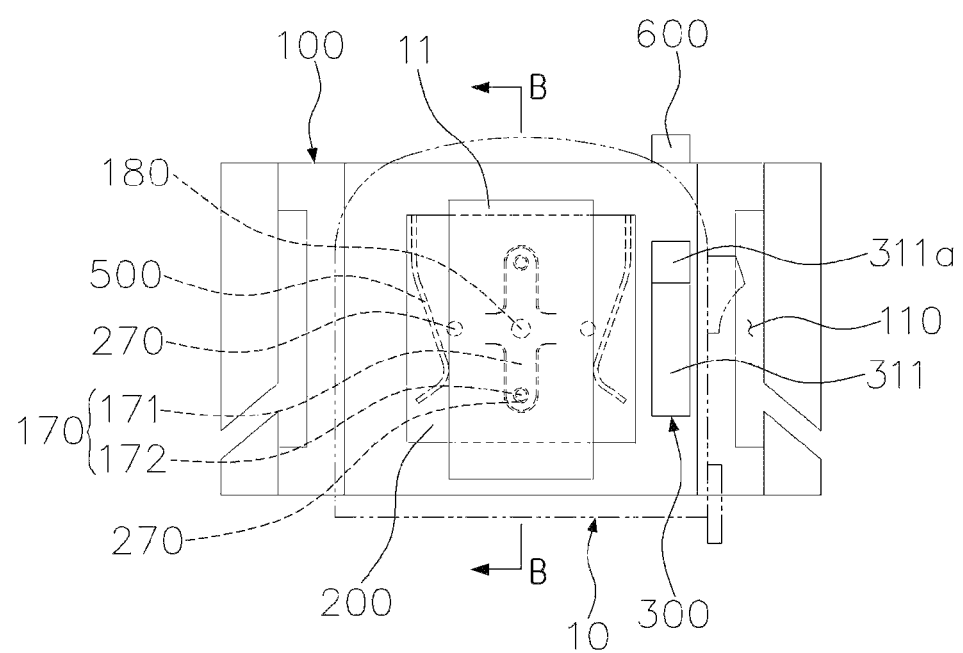
FIG. 6 is a view conceptually showing the state when the belt holder for a tape measure of FIG. 1 is used in a mounting mode.
Figure 7:
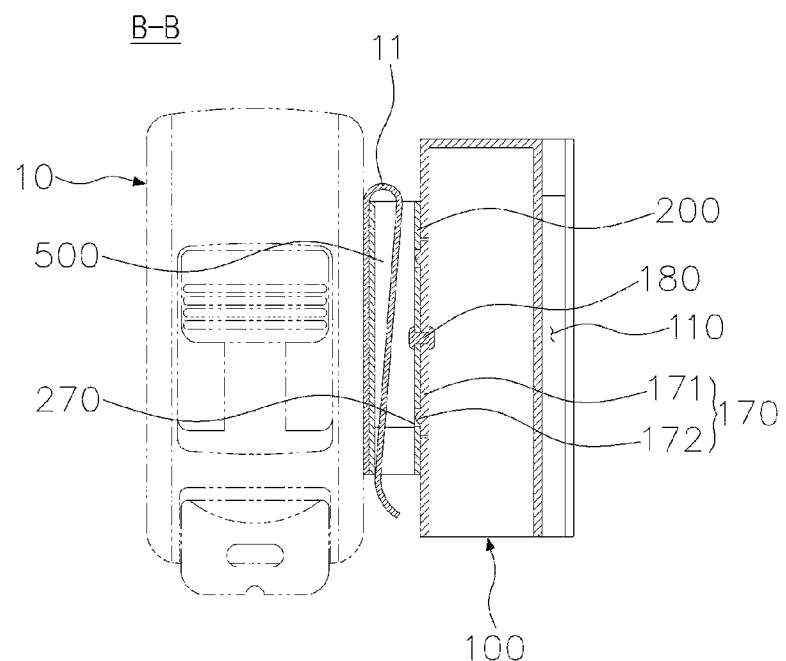
FIG. 7 is a cross-sectional view taken along line B-B of FIG. 6.
Figure 8:
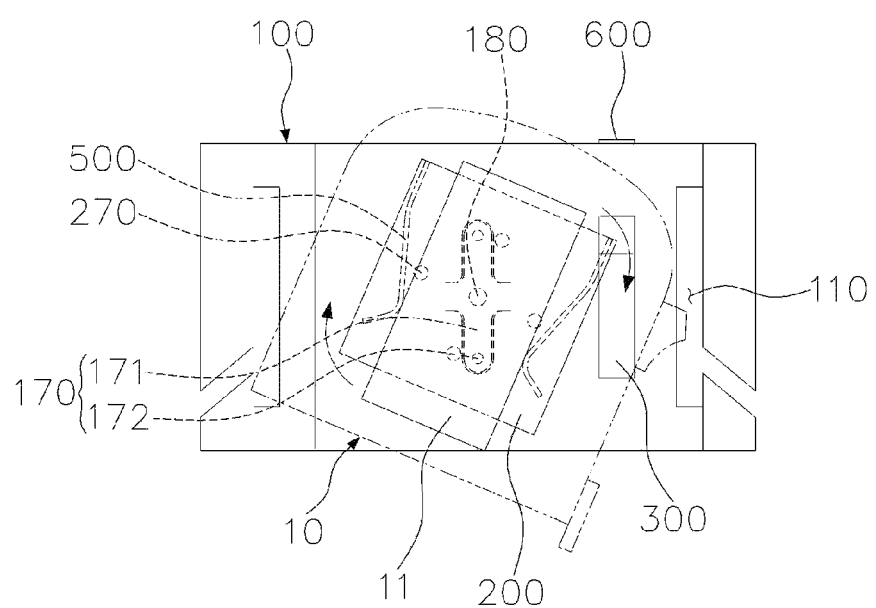
FIG. 8 is a view conceptually showing a process of changing the belt holder for a tape measure of FIG. 6 into a locking mode from the mounting mode.
Figure 9:
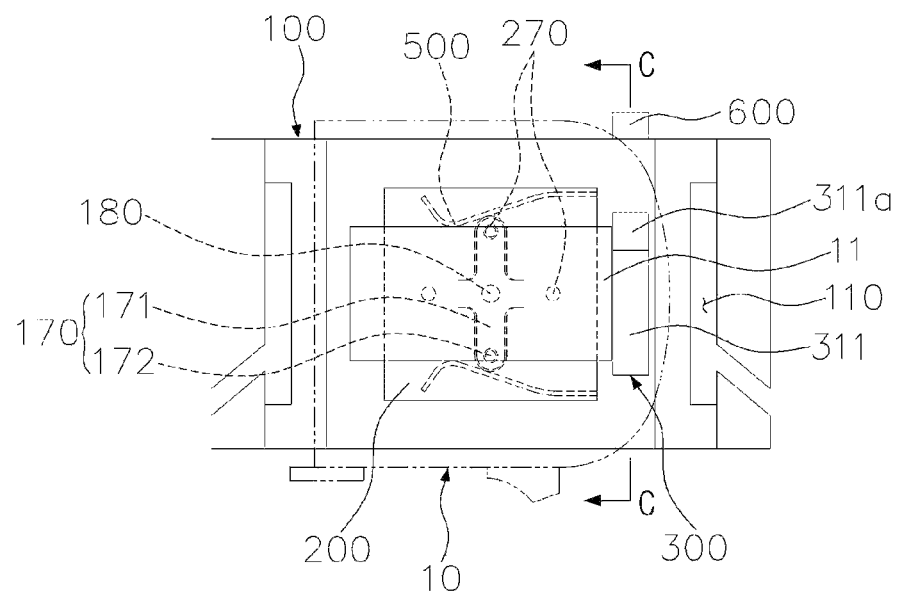
FIG. 9 is a view conceptually showing the state when the belt holder for a tape measure of FIG. 1 is used in the locking mode.
Figure 10:
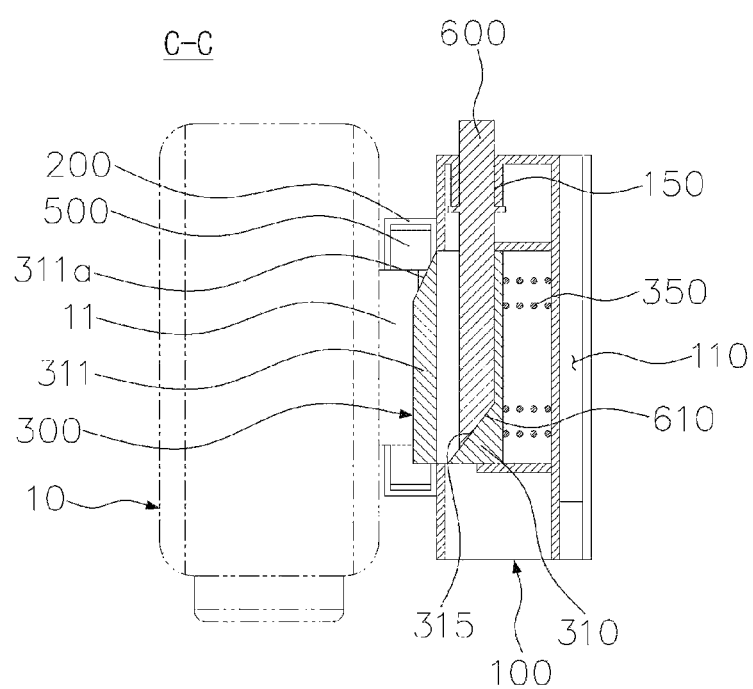
FIG. 10 is a conceptual cross-sectional view taken along line C-C of FIG. 9.
Figure 11:
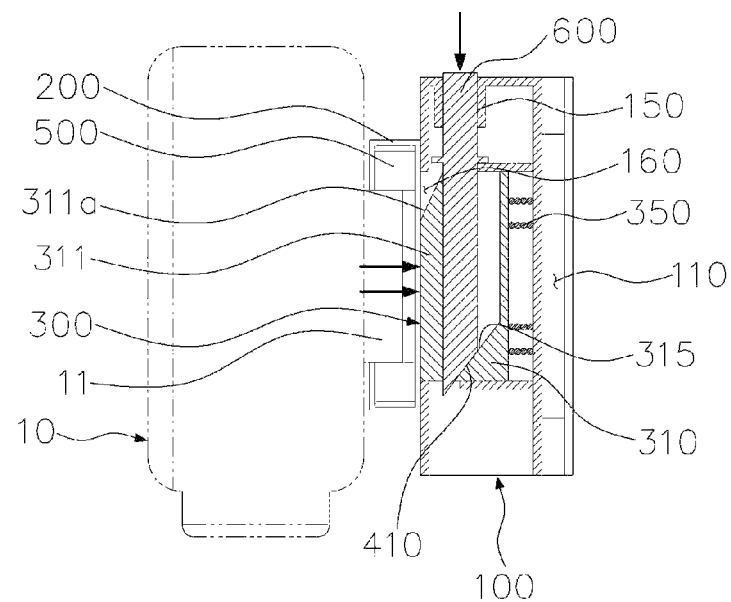
FIG. 11 is a view when a releaser has been pressed in the cross-sectional view of FIG. 10.

FIG. 1 is a perspective view of a belt holder for a tape measure according to a first embodiment of the present disclosure, FIG. 2 is a view showing the state when the belt holder for a tape measure of FIG. 1 has been mounted on a belt, FIG. 3 is a view showing the state when a tape measure has been mounted on the belt holder for a tape measure shown in FIG. 2, FIG. 4 is a view showing the belt holder for a tape measure of FIG. 1 with a rotary mount separated, FIG. 5 is a cross-sectional view of the rotary mount of FIG. 4 taken along line A-A, FIG. 6 is a view conceptually showing the state when the belt holder for a tape measure of FIG. 1 is used in a mounting mode, FIG. 7 is a cross-sectional view taken along line B-B of FIG. 6, FIG. 8 is a view conceptually showing a process of changing the belt holder for a tape measure of FIG. 6 into a locking mode from the mounting mode, FIG. 9 is a view conceptually showing the state when the belt holder for a tape measure of FIG. 1 is used in a locking mode, FIG. 10 is a conceptual cross-sectional view taken along line C-C of FIG. 9, and FIG. 11 is a view when a releaser has been pressed in the cross-sectional view of FIG. 10.

A belt holder for a tape measure according to an embodiment of the present disclosure is designed to be able to hang a tape measure 10 having a belt clip 11 of the related art on a belt 20 and includes a holder body 100, a rotary mount 200, a locking bracket 300, a releaser 600, etc.

The belt holder for a tape measure of the embodiment can be used in any one use mode of a mounting mode in which the tape measure 10 can be simply mounted to be freely separated and used and a locking mode in which the mounted tape measure 10 is changed into a locking mode not to be separated.

The holder body 100 is mounted on the belt 20 in a fixed posture and has belt fastening portions 110 for mounting on the belt 20.

The belt fastening portions 110 of the embodiment are belt holes 110 formed like slits through both left and right sides of the holder body 100 (see FIG. 4). The belt holes 110 of the holder body 100 are partially cut in C-shapes. This is for easily fastening the belt holder 100 to the belt 20 by expanding the belt holes 110 in accordance with the thickness or the width of the belt 20. The structure of the belt fastening portions 110 and the fastening type of the belt 20 may depend on embodiments.

The rotary mount 200 is provided for mounting the tape measure 10 by inserting the belt clip 11 of the tape measure 10 therein. The rotary mount 200 is rotatably coupled to the front surface of the holder body 100. In more detail, the center of the rear surface of the rotary mount 200 is rotatably coupled to the center of the front surface of the holder body 100 by a rotary shaft 180. Coupling of the rotary mount 200 and the holder body 100 using the rotary shaft 130 can be seen in FIG. 7. The rotatable coupling of the rotary mount 200 and the holder body 100 may be achieved in various ways.

A clip hole 221 through which the belt clip 11 of the tape measure 10 is inserted is formed in the up-down direction through the rotary mount 200. That is, the tape measure 10 is mounted on the rotary mount 200 by vertically inserting the belt clip 11 of the tape measure 10 downward into the clip hole 221.

The shape of the rotary mount 200 may correspond to the shape of common belt holders for a tape measure.

A pair of clip fixing plate springs 500 for holding and fixing the belt clip 11 inserted in the rotary mount 200 through the clip hole 221 at both left and right sides are disposed in the rotary mount 200.

The clip fixing plate springs 500 are provided to be able to hold and fix the belt clip 11 in the rotary mount 200 regardless of the size of the belt clip 11 that is inserted in the rotary mount 200.

That is, even if the belt clip 11 is wide or narrow, the clip fixing plate springs 500 deform and fix the belt clip 11.

The clip fixing plate springs 500 of the embodiment are plate springs of which only the upper end portions are fixed to the upper portion inside the rotary mount 200. When the belt clip 11 is inserted into the rotary mount 200, the lower end portions of the pair of clip fixing plate springs 500 open, thereby being able to receive the belt clip 11 regardless of the width of the belt clip 11.

It is possible to change the direction that the clip hole 221 faces by rotating the rotary mount 200 with respect to the holder body 100. In more detail, it is possible to change the positions into a posture for the mounting mode in which the clip hole 221 has been erected to face up or a posture for the locking mode in which the clip hole 221 has been inclined or faces the horizontal direction by rotating from the posture for the mounting mode.

In order to fix the rotary mount 200 in the posture for the mounting mode or the posture for the locking mode, a spring protrusion 170 and locking grooves 270 are provided on the surfaces of the holder body 100 and the rotary mount 200 facing each other, respectively.

The spring protrusion 170 has protrusions 172 on a plate spring 171. The plate spring 171 for the spring protrusion 170 is formed like a cantilever by forming a groove on the surface facing the rotary mount 200 of the holder body 100.

The locking grooves 270 are recessed grooves for inserting the protrusions 172 of the spring protrusion 170. The locking grooves 270 are formed at the portions where the protrusions 172 are in contact with the rotary mount 200 when the rotary mount 200 is vertically upright and the portions where the protrusions 172 are in contact with the rotary mount 200 when the rotary mount 200 is rotated.

In the embodiment, in order the elastically fix the posture in which the rotary mount 200 has been vertically upright (posture for the mounting mode) and the posture in which the rotary mount 200 has been rotated (posture for the locking mode, two spring protrusions 170 are provided at 12 o'clock and 6 o'clock on the front surface of the holder body 100, respectively, and two pairs of locking grooves 270 are provided at 12 and 6 o'clock and 3 and 9 o'clock on the rear surface of the rotary mount 200, respectively.

The belt holder for a tape measure can be used in the mounting mode when the rotary mount 200 is erect, that is, in the posture for the mounting mode.

That is, it is possible to simply mount the tape measure 10 by inserting the belt clip 11 of the tape measure 10 into the clip hole 221 and it is possible to separate the tape measure 10 without specific operation by taking the belt clip 11 out of the clip hole 211.

When the rotary mount 200 is rotated (90 degrees in this embodiment) with the belt clip 11 of the tape measure 10 inserted in the clip hole 221 of the rotary mount 200, the locking mode in which the belt clip 11 is not separated from the rotary mount 200 can be achieved.

To this end, a locking bracket 300 preventing the belt clip 11 inserted in the clip hole 221 from separating from the clip hole 221 is slidably disposed on the holder body 100.

The locking bracket 300 can reciprocate between a position where it prevents separation of the belt clip 11 and a position where it does not prevent separation of the belt clip 11.

The locking bracket 300 has a locking jaw 311, so after the rotary mount 200 is rotated, the locking jaw 311 keeps protruding from the holder body 100 and blocks the top of the clip hole 221 of the rotary mount 200. That is, the locking jaw 311 of the locking bracket 300 blocks the top of the clip hole 221, thereby preventing the tape measure 10 from separating from the rotary mount 200.

The locking bracket 300 has a locking bracket body 310 that can slide inside the holder body 100, and the locking jaw 311 protruding to the front surface of the holder body 100 from the locking bracket body 310.

A restoring spring 350 elastically supporting the locking bracket 300 in one direction is provided to keep the locking jaw 311 at the position where the locking jaw 311 prevents separation of the belt clip 11.

In this embodiment, the restoring spring 350 elastically press the locking bracket body 310 such that the locking jaw 311 protrudes from the front surface of the holder body 100.

A locking bracket hole 160 for inward/outward movement of the locking bracket 300 is formed at the holder body 100. The locking bracket hole 160 is elongated up and down at a left or right side of the front surface of the holder body 100. The locking jaw 311 of the locking bracket 300 can protrude out of the front surface of the holder body 100 through the locking bracket hole 160.

The locking jaw 311 that protrudes forward through the locking bracket hole 160 is also elongated up and down to correspond to the locking bracket hole 160.

A mount contact slope 311a smoothly inclined toward the front surface of the holder body 100 is formed at the upper portion of the locking jaw 311 so that the rotary mount 200 can come in contact with the locking jaw 311 and push the locking jaw into the holder body 100 when the rotary mount 200 is rotated.

When a user inserts the belt clip 11 of the tape measure into the clip hole 221 of the rotary mount 200 and then rotates the rotary mount 200, an edge of the rotary mount 200 pushes the locking jaw 311 into the holder body 100 while sliding on the mount contact slope 311a of the locking jaw 311, whereby the locking jaw 311 does not interfere with rotation of the rotary mount 200.

When the rotary mount 200 is rotated 90 degrees such that the top of the clip hole 211 faces 3 o'clock, the locking jaw 311 inserted in the holder body 100 by the rotary mount 200 protrudes again from the front surface of the holder body 100 by the restoring spring 350 without interference with the rotary mount 200, etc.

The locking jaw 311 protruding from the front surface of the holder body 100 blocks the top of the clip hole 221 of the rotary mount 200 and prevents the belt clip 11 from separating from the clip hole 221.

Since the mount contact slope 311a is provided only at the upper portion of the locking jaw 311 in this embodiment, the locking jaw 311 can be pushed into the holder body 100 only when the vertically upright rotary mount 200 is rotated to 3 o'clock.

The belt holder for a measuring tap of this embodiment further has a releaser 600, and only when the releaser 600 is operated, the locking jaw 311 is pushed inside such that the rotary mount 200 can be vertically upright. Although the releaser 600 is implemented in a button type for unlocking in this embodiment, the releaser 600 may be achieved in various ways.

As described above, in this embodiment, it is easy to change into the locking mode and the locking mode is changed into the mounting mode only when the releaser 600 is operated, so the use mode is prevented from changing by a mistake of a user.

The locking bracket body 310 of the locking bracket 300 has a first contact slope 315 for pushing the locking jaw 311 of the locking bracket 300 into the holder body 100 using the releaser 600.

A second contact slope 610 for moving the locking bracket 300 rearward from the front of the holder body 100 in contact with the first contact slope 315 is formed at the lower end of the releaser 600.

The releaser 600 is disposed through a releaser hole 150 formed through the top of the holder body 100 such that the second contact slope 610 at the lower end is in contact with the first contact slope 315 of the locking bracket 300.

When the top of the releaser 600 is pressed down, the second contact slope 610 pushes rearward the locking bracket 300 while sliding on the first contact slope 315 of the locking bracket 300, whereby the locking jaw 311 is moved into the holder body 100 and does not prevent separation of the belt clip 11.

The belt holder for a tape measure according to an embodiment of the present disclosure can be used in the mounting mode in which the tape measure 10 is mounted by inserting the belt clip 11 of the tape measure 10 into the rotary mount 200 or the tape measure 10 can be easily separated with the rotary mount 200 vertically upright with respect to the holder body 100.

When a user needs to frequently take out and use the tape measure 10, the user does not need to operate the releaser 600 every time he/she separates the measuring type by using the belt holder for a tape measure in the mounting mode, so it is very convenient to use the tape measure 10.

The belt holder for a tape measure according to an embodiment of the present disclosure can be used in the locking mode in which the locking jaw 311 is positioned at the top of the clip hole 221 with the rotary mount 200 in the posture for the locking mode in which the rotary mount 200 has been rotated. That is, the rotary mount 200 is rotated 90 degrees with the belt clip 11 of the tape measure 10 inserted in the rotary mount 200 such that the locking jaw 311 is positioned at the top of the belt clip 11 of the tape measure 10, whereby separation of the belt clip 11 is prevented by the locking jaw 311.

When there is a possibility of separation of the tape measure 10 from the belt holder for a tape measure due to excessive movement of a user, it is possible to prevent the tape measure 10 from unintentionally separating from the belt holder for a tape measure by changing the belt holder for a tape measure into the locking mode.

The mounting mode can be simply changed into the locking mode by holding and rotating the tape measure 10 mounted on the rotary mount 200 90 degrees with a hand.

In order to change into the mounting mode from the locking mode, it is required to press the releaser 600 and rotate the rotary mount 200 back into the vertically upright posture, so it is possible to securely prevent the tape measure 10 from separating from the belt holder for a tape measure by mistake.

A second embodiment of the present disclosure is described hereafter.

Figure 12:
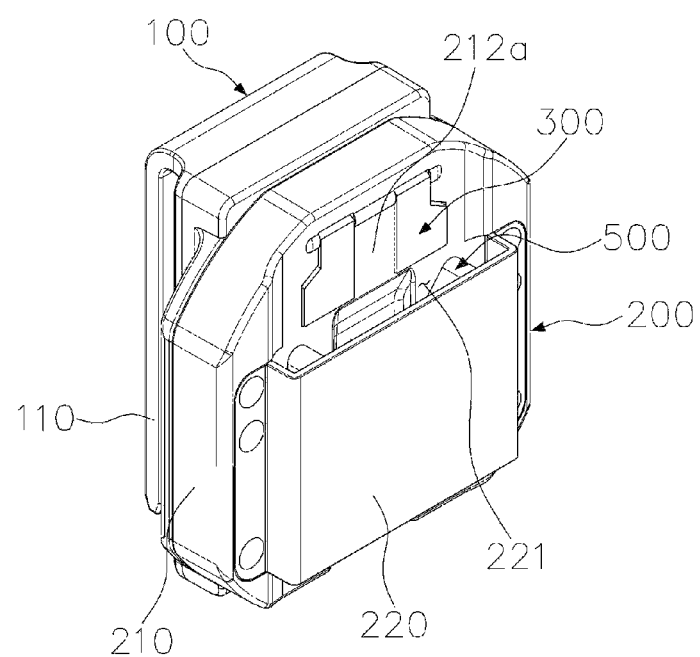
FIG. 12 is a perspective view of a belt holder for a tape measure according to a second embodiment of the present disclosure.
Figure 13:
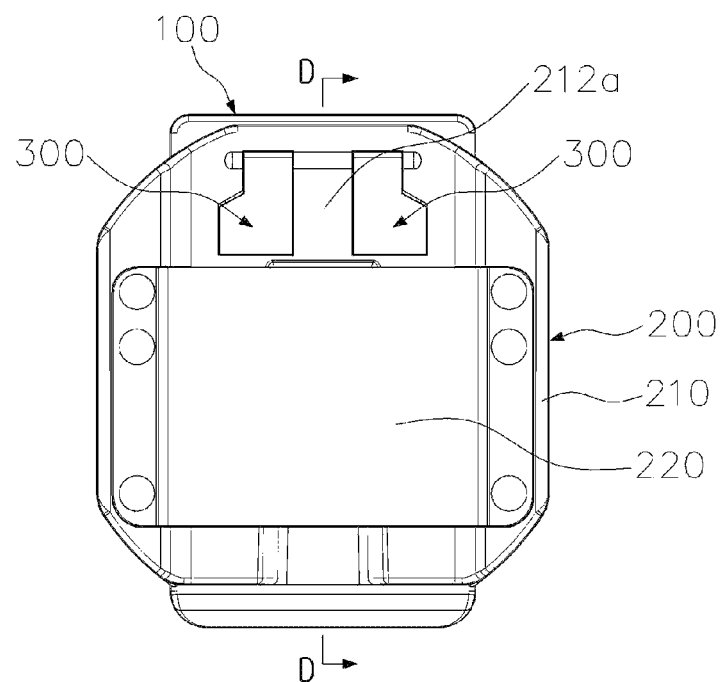
FIG. 13 is a front view of the belt holder for a tape measure of FIG. 12.
Figure 14:
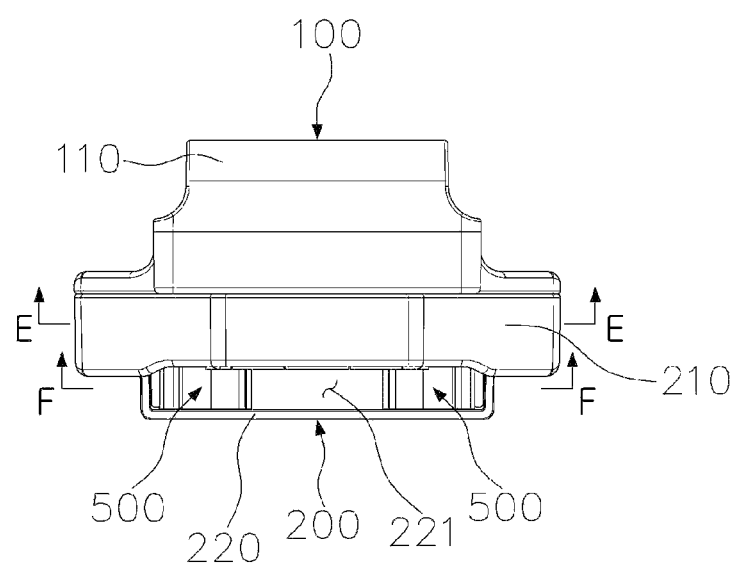
FIG. 14 is a plan view of the belt holder for a tape measure of FIG. 12.
Figure 15:
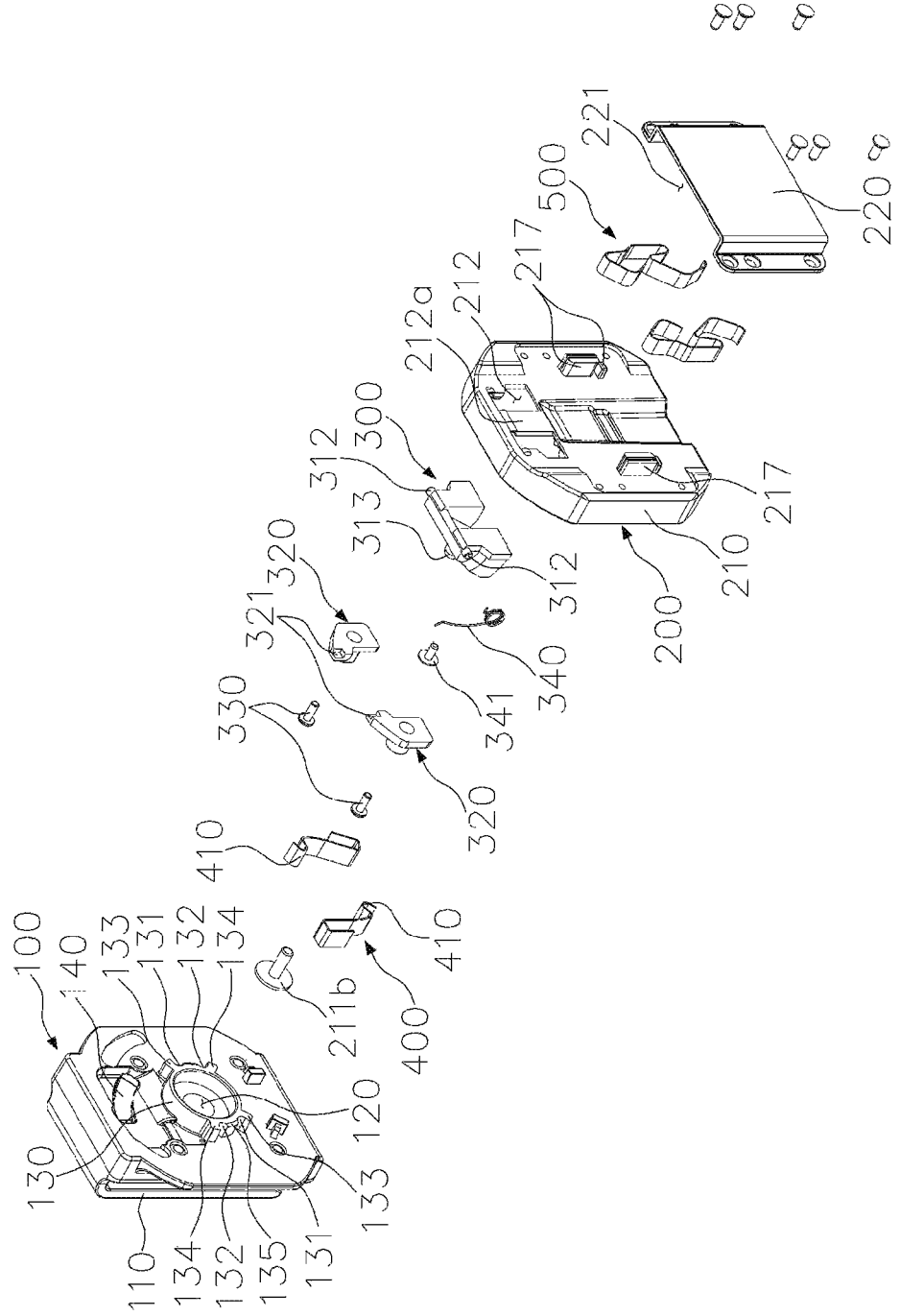
FIG. 15 is an exploded perspective view of the belt holder for a tape measure of FIG. 12.
Figure 16:
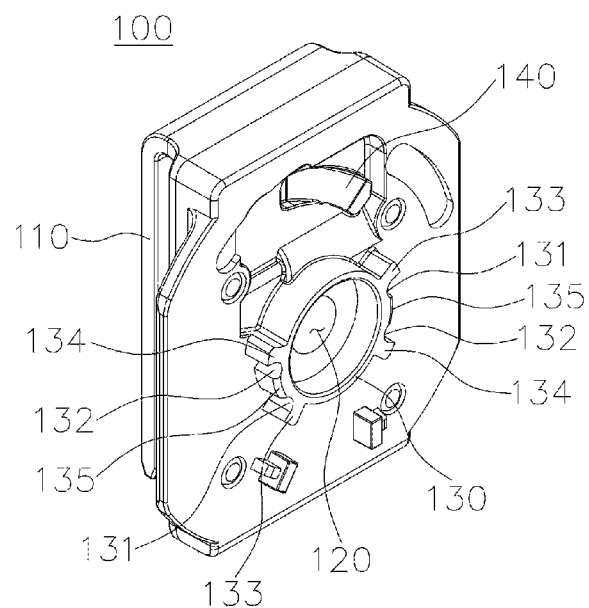
FIG. 16 is an enlarged perspective view of a holder body of FIG. 15.
Figure 17:
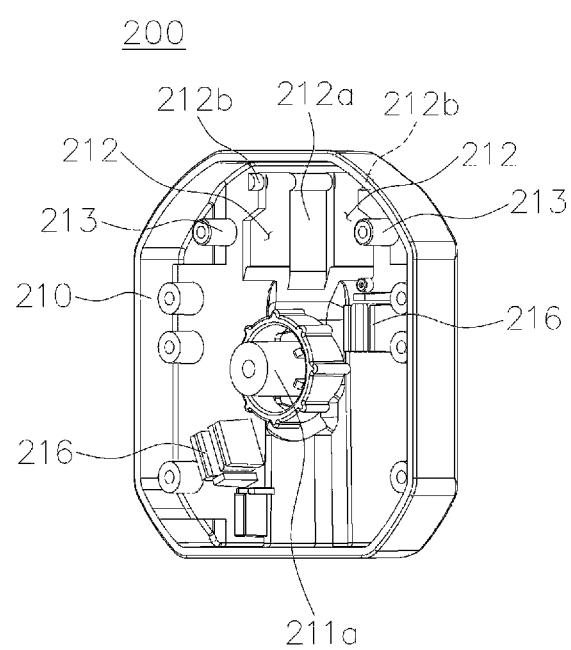
FIG. 17 is an enlarged perspective view showing the rotary mount of FIG. 15 in another direction.
Figure 18:
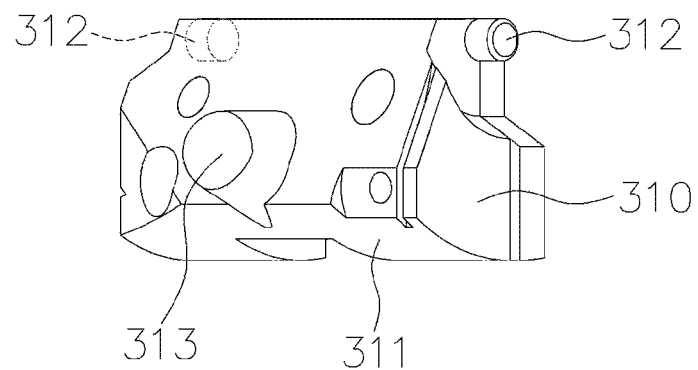
FIG. 18 is an enlarged perspective view showing a locking bracket of FIG. 15 in another direction.
Figure 19:
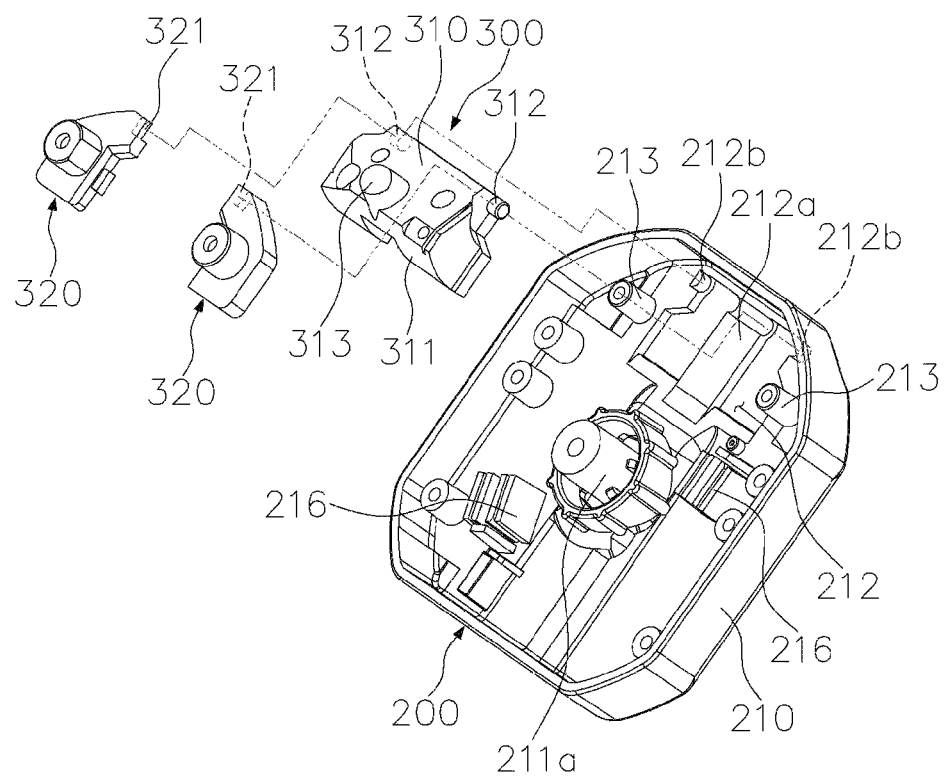
FIG. 19 is a view showing the structure for coupling the locking bracket to the rotary mount of FIG. 17.
Figure 20:
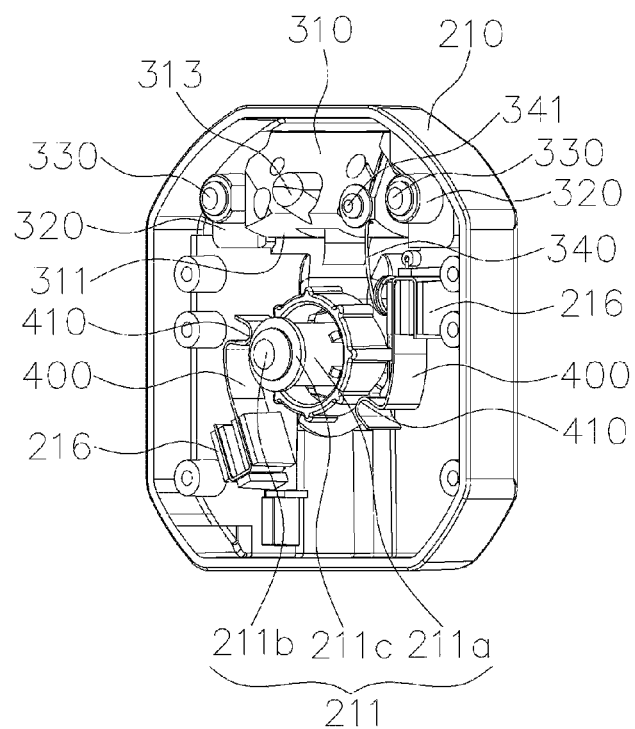
FIG. 20 is a perspective view showing the state when the locking bracket and a position-fixing plate spring have been coupled to the rotary mount of FIG. 17.
Figure 21:
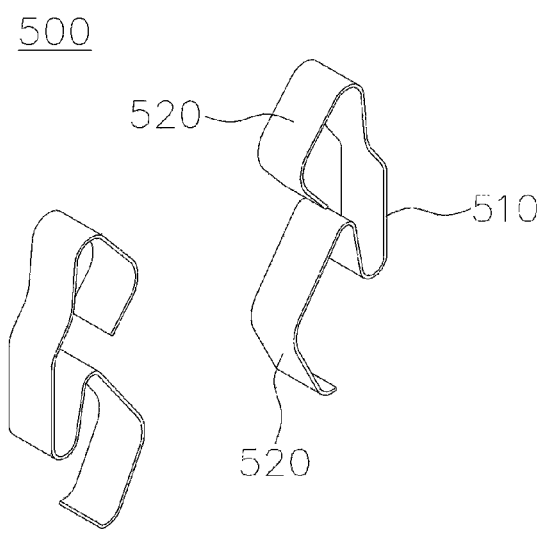
FIG. 21 is an enlarged perspective view of a pair of clip fixing plate springs of FIG. 15.
Figure 22:
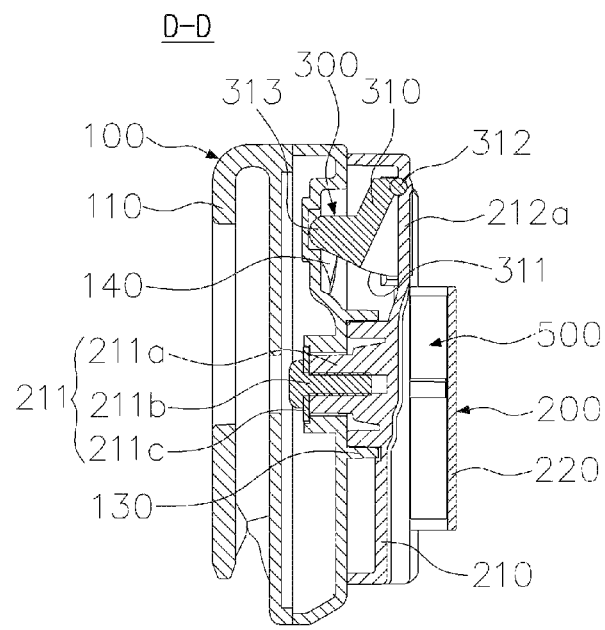
FIG. 22 is a conceptual cross-sectional view of the belt holder for a tape measure of FIG. 13 taken along line D-D.
Figure 23:
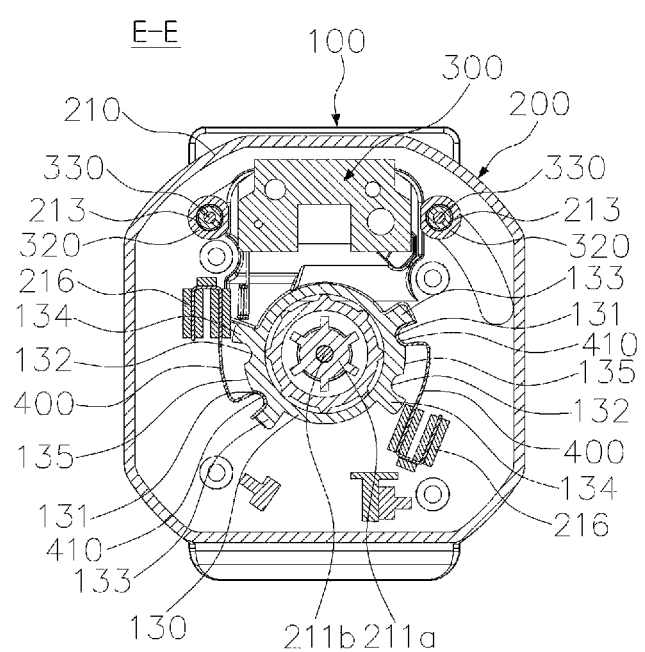
FIG. 23 is a conceptual cross-sectional view of the belt holder for a tape measure of FIG. 14 taken along line E-E.
Figure 24:
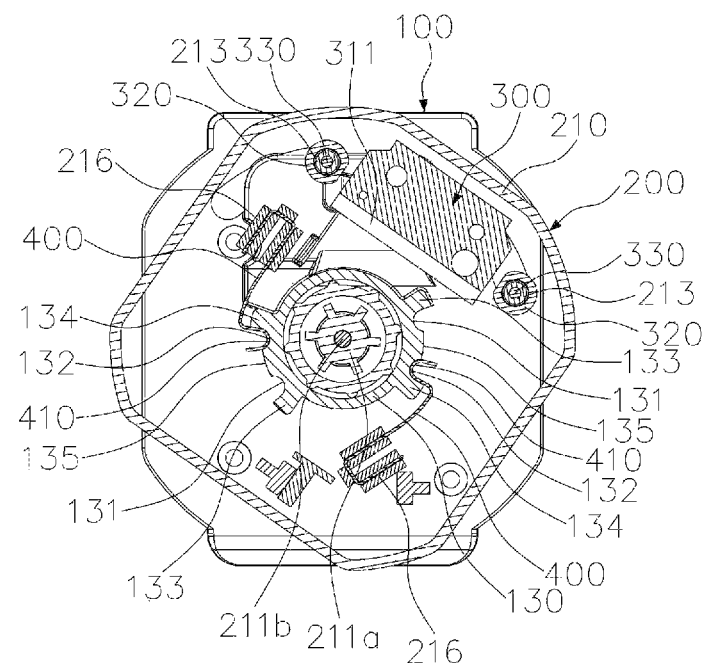
FIG. 24 is a view when the rotary mount has been rotated with respect to the holder body, which corresponds to FIG. 22.
Figure 25:
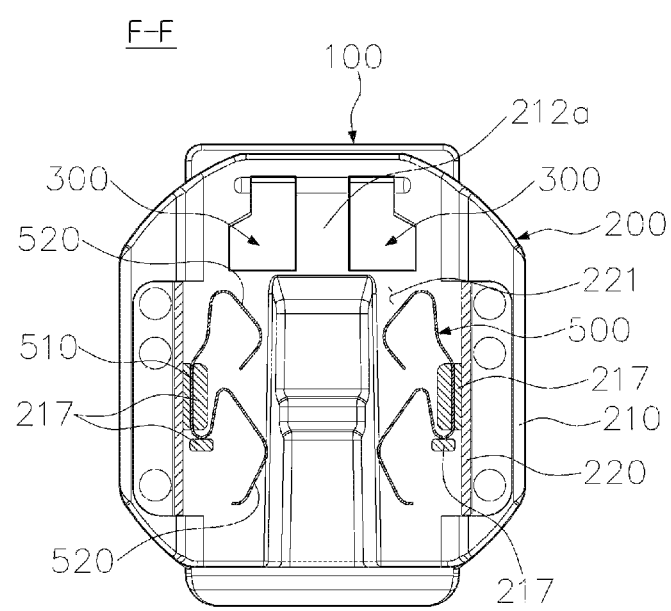
FIG. 25 is a conceptual cross-sectional view of the belt holder for a tape measure of FIG. 14 taken along line F-F.

FIG. 12 is a perspective view of a belt holder for a tape measure according to a second embodiment of the present disclosure, FIG. 13 is a front view of the belt holder for a tape measure of FIG. 12, FIG. 14 is a plan view of the belt holder for a tape measure of FIG. 12, FIG. 15 is an exploded perspective view of the belt holder for a tape measure of FIG. 12, FIG. 16 is an enlarged perspective view of a holder body of FIG. 15, FIG. 17 is an enlarged perspective view showing the rotary mount of FIG. 15 in another direction, FIG. 18 is an enlarged perspective view showing a locking bracket of FIG. 15 in another direction, FIG. 19 is a view showing the structure for coupling the locking bracket to the rotary mount of FIG. 17, FIG. 20 is a perspective view showing the state when the locking bracket and a position-fixing plate spring have been coupled to the rotary mount of FIG. 17, FIG. 21 is an enlarged perspective view of a pair of clip fixing plate springs of FIG. 15, FIG. 22 is a conceptual cross-sectional view of the belt holder for a tape measure of FIG. 13 taken along line D-D, FIG. 23 is a conceptual cross-sectional view of the belt holder for a tape measure of FIG. 14 taken along line E-E, FIG. 24 is a view when the rotary hanger has been rotated with respect to the holder body, which corresponds to FIG. 22, and FIG. 25 is a conceptual cross-sectional view of the belt holder for a tape measure of FIG. 14 taken along line F-F.

A belt holder for a tape measure of this embodiment includes a holder body 100, a rotary mount 200, a locking bracket 300, posture-fixing plate springs 400, and clip fixing plate springs 500.

A belt fastening portion 110 is formed at the holder body 100 and the belt fastening portion 110 of this embodiment is a clip that is fitted on a belt to be fixed.

A posture-fixing plate spring stopper 130 interacting with the posture-fixing plate springs 400 and a guide slope 140 interacting with the locking bracket 300 as a locking bracket rotating portion, etc. are formed on the front surface of the holder body 100.

The rotary mount 200, the posture-fixing plate springs 400, and the locking bracket 300 are described first for easy understanding of the structures of the posture-fixing plate spring stopper 130 and the guide slope 140.

The rotary mount 200 of this embodiment has a rotary mount body 210 rotatably coupled to the holder body 100, and a clip mount 220 having a clip hole 221 for inserting the belt clip 11 and disposed on the front surface of the rotary mount body 210 such that the belt clip 11 can be mounted.

The clip mount 220 of this embodiment is manufactured separately from the rotary mount body 210 and is bolted to the rotary mount body 210.

The clip hole 221 defined in the up-down direction over the front surface of the rotary mount body 210 by the clip mount 220 is flat in the front-rear direction.

The rotary mount 200 is coupled to the front surface of the holder body 100 to be rotatable about a rotary shaft 211 (see FIG. 22).

The rotary shaft 211 is composed of a shaft member 211a for a rotary shaft formed at the center of the rear surface of the rotary mount body 210 and inserted in a rotary shaft hole 120 at the center of the holder body 100, and a bolt member 211b for a rotary shaft coupled to the shaft member 211a for a rotary shaft by a washer 211c.

As shown in FIG. 22, the bolt member 211b for a rotary shaft is thread-fastened to the shaft member 211a for a rotary shaft on the rear surface of the holder body 100, whereby the rotary mount 200 is rotatably coupled to the holder body 100.

A locking bracket hole 212 for inward/outward movement of the locking bracket 300 to be described below is formed at the upper portion of the rotary mount body 210. When the locking bracket 300 is rotated forward, the locking jaw 311 of the locking bracket 300 protrudes forward through the locking bracket hole 212, and when the locking bracket 300 is rotated backward, the locking bracket 300 is positioned inside the rotary mount body 210 without protruding outside.

The locking bracket hole 212, as can be seen from the figures, is divided to the left and right sides with a support 212a at the center therebetween. The support 212a prevents the locking bracket 300 from rotating forward over the rotation range.

Locking bracket coupler mounts 213 for mounting locking bracket couplers 320 are formed on the rear surface of the rotary mount body 210. The locking bracket couplers 320 are provided to rotatably couple the locking bracket 300 to the rotary mount 200.

Two posture-fixing plate spring fitting portions 216 for coupling the posture-fixing plate springs 400 are formed on the rotary mount 200. The posture-fixing plate spring fitting portions 216 having a shape in which ends of the posture-fixing plate springs 400 bent in inverse U-shapes can be fitted.

The posture-fixing plate springs 400 are latched to the posture-fixing plate spring stopper 130 of the holder body 100 to be described below to elastically fix the posture of the rotary mount 200 with respect to the holder body 100.

In more detail, the posture-fixing plate spring stopper 130 is provided to elastically support the posture for the mounting mode in which the rotary mount 200 is maintained in a vertically upright posture on the holder body 100 and the posture for the locking mode in which the rotary mount 200 is maintained in a rotated posture on the holder body 100.

The posture-fixing plate spring 400 extends to surround the rotary shaft 211 with one end portion fixed to the rotary mount 200. An end portion of the posture-fixing plate spring 400 is bent in an inverse U-shape to be fitted in the posture-fixing plate spring fitting portion 216 of the rotary mount body 210.

An end portion of the posture-fixing plate spring 400 is fixed to the posture-fixing plate spring fitting portion 216 and a locking protrusion 410 protruding in a U-shape toward the rotary shaft 211 is formed at another end thereof.

In this embodiment, two posture-fixing plate springs 400 are provided.

The locking bracket 300 is provided to prevent the belt clip 11 from separating from the clip hole 211 with the rotary mount 200 rotated with respect to the holder body 100.

The locking bracket 300 of this embodiment has a locking bracket body 310 and a sliding protrusion 313.

The locking bracket body 310 has a locking jaw 311 at a side to prevent separation of the belt clip 11 through the top of the clip hole 221 and a locking bracket rotation shaft 312 at another side to function as a rotary shaft and to be coupled to the rotary mount 200.

In this embodiment, the locking jaw 311 can reciprocated between a position where it prevents separation of the belt clip 11 and a position where it does not prevent separation of the belt clip 11. To this end, the locking bracket body 310 is rotatably coupled to the rotary mount 200.

The sliding protrusion 313 protrudes from the locking bracket body 310 toward the holder body 100, in detail, toward the guide slope 140.

The locking bracket body 310 has an arc shape that can rotate about the locking bracket rotation shaft 312 when seen from a side. A pair of locking bracket holes 212 is formed at left and right sides with the support 212a therebetween, and similarly, a pair of locking jaws 311 is formed on the locking bracket body 310 and has a shape corresponding to the shape of the locking bracket holes 212.

The locking bracket 300 is coupled to the rotary mount body 210 to be rotatable forward and backward such that the locking jaw 311 blocks or does not block the top of the clip hole 221 when the locking bracket body 310 is moved into and out of the locking bracket hole 212.

The locking bracket 300, as shown in FIGS. 19 and 20, is disposed such that locking bracket rotation shafts 311 formed on left and right sides of the locking bracket 300 are seated in first coupling protrusion seat grooves 212b formed at left and right sides of the locking bracket hole 212.

The locking bracket couplers 320 are mounted on the rotary mount body 210 such that second coupling protrusion seat grooves 321 of the locking bracket couplers 320 cover the locking bracket rotation shafts 312. The locking bracket couplers 320 are fixed to the locking bracket coupler mounts 213 by coupling bolts 330.

The locking bracket rotation shafts 312 of the locking bracket 300 are inserted in the first coupling protrusion seat grooves 212b of the rotary mount 200 and the second coupling protrusion seat grooves 321 of the locking bracket couplers 320, and the locking bracket 300 can be rotated forward and backward.

The sliding protrusion 313 protruding toward the holder body 100 is formed on the rear of the locking bracket body 310. The sliding protrusion 313 is provided to slide on the guide slope 140 that is a locking bracket rotation portion of the holder body 100 to be described below. The sliding protrusion 313 slides on the guide slope 140 so that the locking bracket body 310 can rotate forward and backward.

A restoring spring 340 elastically supporting the locking bracket 300 in one direction is provided for the locking bracket 300 and the rotary mount body 210 to maintain the locking jaw 311 at the position where the locking jaw 311 does not prevent separation of the belt clip 11.

The locking bracket 300 is elastically supported to rotate backward by the restoring spring 340.

The restoring spring 340 of this embodiment is a torsion spring that applies elasticity to the locking bracket 300. A first end of the restoring spring 340 is supported against the rotary mount body 210 and a second end thereof is supported against the locking bracket body 310. The second end of the restoring spring 340, as can be seen from FIG. 20, is fixed to the locking bracket 300 by a spring fixing bolt 341.

The restoring spring 340 rotates the locking bracket 300 backward such that the locking jaw 311 does not protrude from the rotary mount body 210. That is, the locking jaw 311 of the locking bracket 300 is moved to the position where the locking jaw 311 does not prevent separation of the belt clip 11 by the restoring spring 340.

As described above, the rotary mount 200 is coupled to the front surface of the holder body 100 to be rotatable about the rotary shaft 211.

The posture-fixing plate spring stopper 130 is formed on the front surface of the holder body 100.

The posture-fixing plate spring stopper 130 is provided to elastically fix the posture of the rotary mount 200 in two postures by cooperating with the posture-fixing plate springs 400 disposed on the rotary mount 200.

One of the postures is the posture for the mounting mode in which the rotary mount 200 is vertically fixed on the holder body 100 and the other one is the posture for the locking mode in which the rotary mount 200 has been rotated with respect to the holder body 100.

The posture-fixing plate spring stopper 130 protrudes in a cylindrical shape surrounding the rotary shaft 211 on the front surface of the holder body 100. A first locking groove 131, a locking protrusion guide 135, and a second locking groove 132 are sequentially formed on the outer surface of the posture-fixing plate spring stopper 130 for each of the posture-fixing plate springs 400.

The locking protrusion 410 of the posture-fixing plate spring 400 is inserted and locked in the first locking groove 131 and the second locking groove 132.

That is, the first locking groove 131 is formed at the portion where the locking protrusion 410 comes in contact with the posture-fixing plate spring stopper 130 when the rotary mount 200 is in the posture for the mounting mode. The second locking groove 132 is formed at the portion where the locking protrusion 410 comes in contact with the posture-fixing plate spring stopper 130 when the rotary mount 200 is in the posture for the locking mode.

The locking protrusion guide surface 135 is a surface extending between the first locking groove 131 and the second locking groove 132 to guide sliding of the locking protrusion 410 of the posture-fixing plate spring 400.

Since the posture-fixing plate springs 400 are elastic plate springs, as described above, when the rotary mount 200 is rotated with respect to the holder body 100, the locking protrusions 410 come out of the first locking grooves 131 or the second locking grooves 132 and slide on the locking protrusion guide surfaces 135.

When the rotary mount 200 goes into the posture for the mounting mode while the locking protrusions 410 slide on the locking protrusion guide surfaces 135, as shown in FIG. 23, the locking protrusions 410 are inserted into the first locking grooves 131 and the rotary mount 200 is elastically fixed to the holder body 100.

Similarly, when the rotary mount 200 goes into the posture for the locking mode with respect to the holder body 100 while the locking protrusions 410 slide on the locking protrusion guide surfaces 135, as shown in FIG. 24, the locking protrusions 410 are inserted into the second locking grooves 132 and the rotary mount 200 is elastically fixed to the holder body 100.

The posture-fixing plate spring stopper 130 has a first anti-rotation step 133 and a second anti-rotation step 134 for preventing the rotary mount 200 from further rotating in the posture for the mounting mode in which the locking protrusion 410 is inserted in the first locking groove 131 or the posture for the locking mode in which the locking protrusion 410 is inserted in the second locking groove 132.

The first anti-rotation step 133 is formed opposite to the locking protrusion guide surface 135 of the first locking groove 131, and prevents the rotary mount 200 from rotating beyond a predetermined position when the rotary mount 200 is rotated into the posture for the mounting mode from the posture for the locking mode.

The second anti-rotation step 134 is formed opposite to the locking protrusion guide surface 135 of the second locking groove 131, and prevents the rotary mount 200 from rotating beyond a predetermined position when the rotary mount 200 is rotated into the posture for the locking mode from the posture for the mounting mode.

In this embodiment, two posture-fixing plate springs 400 are provided at the rotary mount 200, and the first locking groove 131, second locking groove 132, locking protrusion guide surface 135, first anti-rotation step 133, and second anti-rotation step 134 are each provided as two pieces on the outer surface of the posture-fixing plate spring stopper 130 to correspond to the posture-fixing plate springs 400.

A locking bracket rotation portion interacting with the locking bracket 300 is formed on the front surface of the holder body 100. In this embodiment, the locking bracket rotation portion is the guide slope 140 formed at the holder body 100.

The locking bracket rotation portion rotates the locking bracket 300 such that the locking jaw 311 of the locking bracket 300 is moved to the position where the locking jaw 311 prevents separation of the belt clip 11 when the rotary mount changes from the posture for the mounting mode to the posture for the locking mode by rotating.

The guide slope 140 is provided to push and rotate the locking bracket 300 forward when the rotary mount 200 is rotated with respect to the holder body 100.

The guide surface 140 extends in an arc shape along the movement path of the sliding protrusion 313 when the rotary mount 200 changes into the posture for the locking mode from the posture for the mounting mode, and protrudes at a slope toward the sliding protrusion 313.

That is, the guide slope 140 is inclined such that the portion being in contact with the sliding protrusion 313 when the rotary mount 200 is in the posture for the mounting mode is low and the portion being in contact with the sliding protrusion 313 when the rotary mount 200 is in the posture for the locking mode is high.

When the rotary mount 200 is rotated into the posture for the locking mode from the posture for the mounting mode with respect to the holder body 100, the sliding protrusion 313 of the locking bracket 300 slides on the guide slope 140 and the locking bracket 300 is rotated forward.

When the locking bracket 300 is rotated forward, the locking jaw 311 protrudes forward through the locking bracket hole 212 and blocks the clip hole 221. In this state, the belt clip 11 inserted in the clip hole 221 cannot be separated from the clip hole 221. That is, the locking mode in which the tape measure 10 is not separated from the rotary mount 200 is achieved.

When the rotary mount 200 is changed into the posture for the mounting mode from the posture for the locking mode, the sliding guide 313 of the locking bracket 300 keeps in contact with the guide slope 140 and slides on the guide slope 140 by the restoring spring 340, and the locking bracket 300 is rotated backward by the elasticity of the restoring spring 340.

When the locking bracket 300 is rotated backward, the locking protrusion 311 does not protrude out of the locking bracket hole 212, so the belt clip 11 can be inserted into the clip hole 221 or can be freely taken out of the clip hole 221. That is, the mounting mode in which the tape measure 10 can be easily mounted on or separated from the rotary mount 200 is achieved.

A pair of clip fixing plate springs 500 are disposed inside the clip mount 220 forming the clip hole 221 of the rotary mount 200.

The clip fixing plate springs 500 are provided to fix the belt clip 11 inserted in the clip hole 221 to the rotary mount 200 by holding left and right sides of the belt clip 11. The clip fixing plate springs 500 are plate spring of which both end portions are bent several times, as can be seen from FIG. 21.

The clip fixing plate springs 500 each have a mount fixing portion 510 formed at the middle portion to be fixed to the rotary mount 200, and a pair of belt clip-elastic supporting portions 520 extending and bending from both ends of the mount fixing portion 510.

Portions of the pair of belt clip-elastic supporting portions 520 of the clip fixing plate spring 500 protrude toward the belt clip 11 and these portions hold the belt clip 11 in contact with left and right sides of the belt clip 11.

The pair of clip fixing plate springs 500 hold and fix the upper and lower portions of the belt clip 11 inserted in the clip hole 221 at left and right sides. As described above, the type of holding and fixing both of the upper and lower portions of the belt clip 11 is for stably mounting the belt clip 11 on the rotary mount 200.

As described above, since the clip fixing plate springs 500 are elastic plate springs, they can hold and fix all types of belt clip 11 regardless of the size or shape of the belt clip 11 that is inserted in the clip hole 221.

The clip fixing plate springs 500 are fixed by clip fixing plate spring-fixing members 550 coupled to clip fixing plate spring-fixing member coupler 215 of the rotary mount body 210 by coupling bolts 560.

The mount fixing portion of the clip fixing plate spring 500 is fitted in a clip fixing plate spring-fixing portion 217 formed on the rotary mount body 210 (see FIG. 25).

Use modes of this embodiment are described hereafter.

Figure 26:
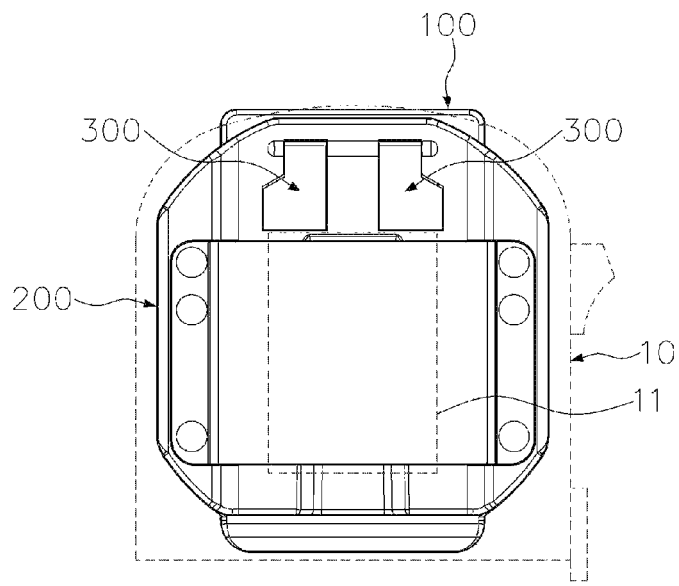
FIG. 26 is a conceptual front view showing the state when the belt holder for a tape measure according to the second embodiment of the present disclosure is used in the mounting mode.
Figure 27:
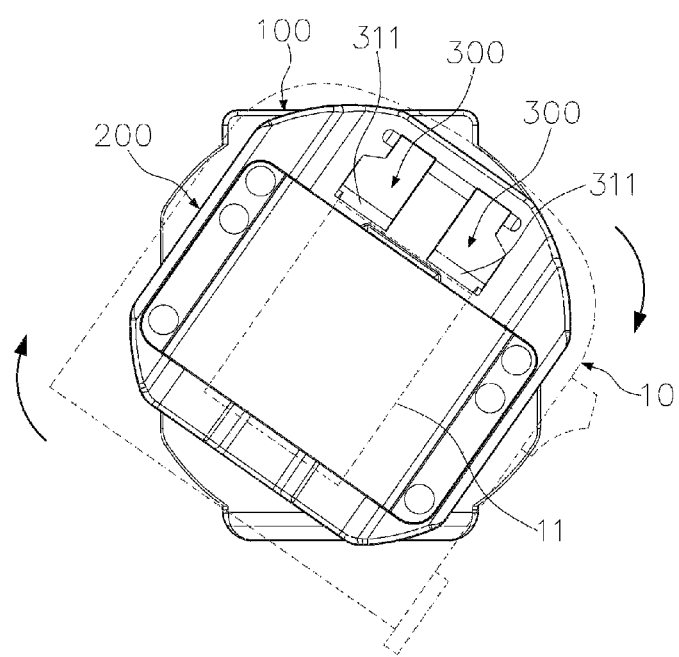
FIG. 27 is a conceptual front view showing the state when the belt holder for a tape measure according to the second embodiment of the present disclosure is used in the locking mode.
Figure 28:
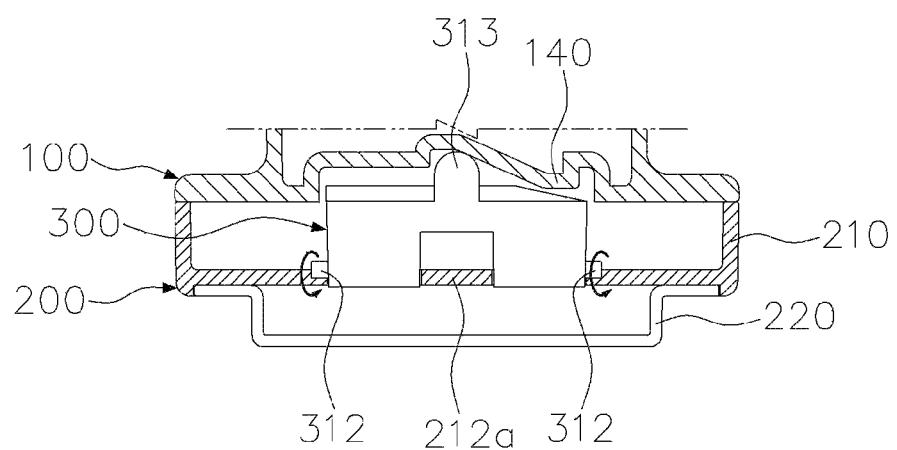
FIG. 28 is a view conceptually showing the state of the locking bracket and the guide slope of the belt holder for a tape measure in the state of FIG. 26.
Figure 29:
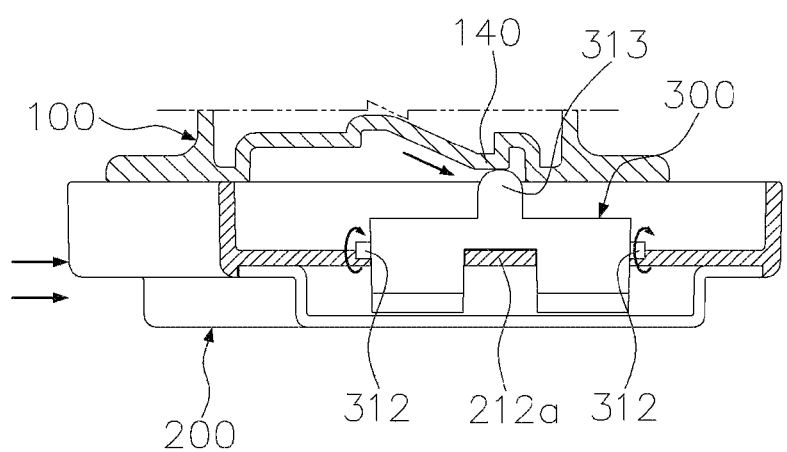
FIG. 29 is a view conceptually showing the state of the locking bracket and the guide slope of the belt holder for a tape measure in the state of FIG. 27.
Figure 30:
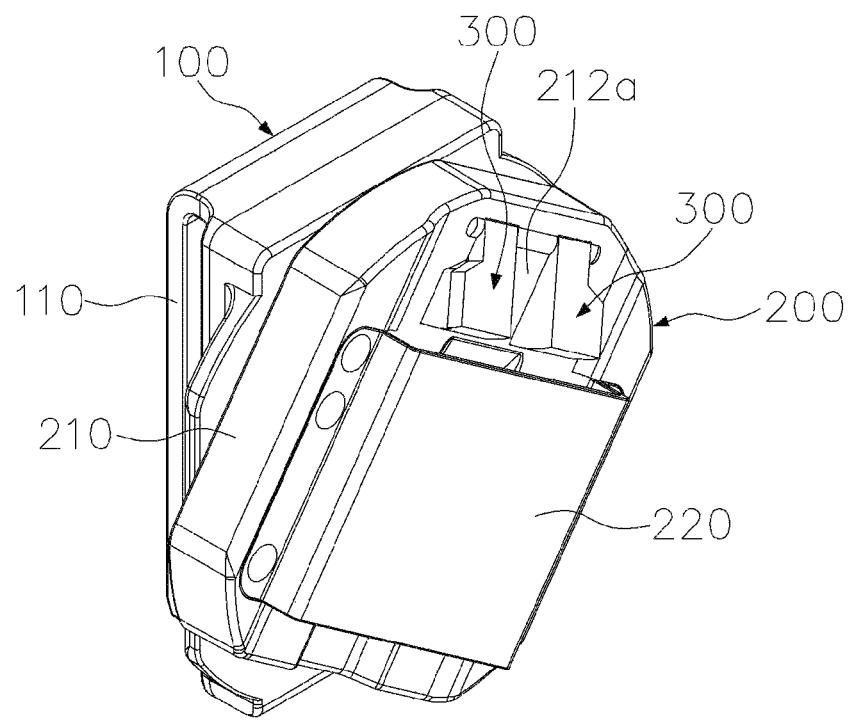
FIG. 30 is a perspective view showing the locking mode state of the belt holder for a tape measure of FIG. 27.

FIG. 26 is a conceptual front view showing the state when the belt holder for a tape measure according to the second embodiment of the present disclosure is used in the hanging mode, FIG. 27 is a conceptual front view showing the state when the belt holder for a tape measure according to the second embodiment of the present disclosure is used in the locking mode, FIG. 28 is a view conceptually showing the state of the locking bracket and the guide slope of the belt holder for a tape measure in the state of FIG. 26, FIG. 29 is a view conceptually showing the state of the locking bracket and the guide slope of the belt holder for a tape measure in the state of FIG. 27, and FIG. 30 is a perspective view showing the locking mode state of the belt holder for a tape measure of FIG. 27.

A portion of a tape measure and a belt clip 11 are shown in FIG. 30.

As described above, the belt holder for a tape measure of the embodiments can be used in two use modes.

One of the modes is the mounting mode in which the rotary mount 200 is vertically upright, as shown in FIG. 26, and the other one is not locking mode in which the rotary mount 200 has been rotated, as shown in FIG. 27.

In the mounting mode in which the rotary mount 200 has been vertically upright on the holder body 100, the locking bracket 300 has been rotated backward by the restoring spring 340, so the locking jaw 311 is hidden in the rotary mount body 210, as shown in FIG. 28.

In the mounting mode, the sliding protrusion 313 of the locking bracket 300 is positioned on the lowest portion of the guide slope 140, as shown in FIG. 28. The locking jaw 311 of the locking bracket 300 is hidden in the rotary mount body 210 without protruding through the locking bracket hole 212 of the rotary mount 200, as shown in FIG. 28.

Since the locking jaw 311 of the locking bracket 300 does not protrude upward from the clip hole 221, it is possible to mount the tape measure 10 by inserting the belt clip 11 into the clip hole 21 and it is possible to separate the tape measure 10 by freely taking the belt clip 11 out of the clip hole 221.

In the mounting mode, it is possible to easily mount the tape measure 10 on the rotary mount 200 and separate and use the tape measure 10 at any time. That is, the mounting mode is used to that the tape measure 10 can be easily mounted and taken out and used while a user works without a possibility of separation of the tape measure 10, whereby convenience of use can be increased.

The locking mode in which the rotary mount 200 has been rotated with respect to the holder body 100 is shown in FIGS. 29 and 30.

For the locking mode in which the rotary mount 200 has been rotated with respect to the holder body 100, as shown in FIG. 29, the sliding protrusion 313 of the locking bracket 300 slides on the guide slope 140 to the highest position, whereby the locking bracket 300 is rotated forward about the locking bracket rotation shaft 312 and the locking jaw 311 protrudes forward through the locking bracket hole 212.

The locking jaw 311 of the locking bracket 300 protrudes forward over the clip hole 221, thereby preventing upward separation of the belt clip 11. That is, the locking jaw is achieved such that the belt clip 11 cannot be taken out of the clip hole 221.

Since the tape measure 10 mounted on the rotary mount 200 is not separated in the locking mode, it is possible to securely prevent the tape measure 10 from separating from the rotary mount 200 even if a worker excessive moves.

According to the belt holder for a tape measure of an embodiment, it is not required to operate a specific button when changing the mounting mode and the locking mode. That is, it is possible to remove the locking state by only holding and rotating the rotary mount 200 with one hand in the locking mode.

Further, since the posture for the mounting mode and the posture for the locking mode are elastically fixed by the posture-fixing plate springs 400 and the posture-fixing plate spring stopper 130, rotation of the rotary mount by mistake can be prevented.

The above description is provided as an exemplary embodiment of the present disclosure and it should be understood that the present disclosure may be easily modified in other various ways without changing the spirit or the necessary features of the present disclosure by those skilled in the art.

Therefore, the embodiments described above are only examples and should not be construed as being limitative in all respects. For example, the components described as a single part may be divided and the components described as separate parts may be integrated.

The present disclosure may be used as a belt holder for a measuring which is mounted on a belt to hang a tape measure.

The invention claimed is:

1. A belt holder for a tape measure which is mounted on a belt to hold the tape measure having a belt clip by hanging the tape measure, the belt holder comprising:
   a holder body configured to be mounted on the belt;
   a rotary mount having a clip hole formed in an up-down direction in which the belt clip of the tape measure is inserted to hang the tape measure, rotatably coupled to a front surface of the holder body, and being able to change into a posture for a mounting mode in which the rotary mount is vertically upright with respect to the holder body and a posture for a locking mode in which the rotary mount is rotated from the posture for the mounting mode;
   a locking bracket having a locking jaw preventing separation of the belt clip from the clip hole, and provided at the holder body or the rotary mount such that the locking jaw can reciprocate between a position where the locking jaw prevents separation of the belt clip and a position where the locking jaw does not prevent separation of the belt clip; and
   a restoring spring elastically supporting the locking bracket in one direction such that the locking jaw of the locking bracket is positioned at the position where the locking jaw prevents separation of the belt clip or the position where the locking jaw does not prevent separation of the belt clip,
   wherein the belt holder can be used in the mounting mode in which the rotary mount is in the posture for the mounting mode and the belt clip of the tape measure can be inserted into the clip hole or can be freely taken out of the clip hole and in the locking mode in which the rotary mount is in the posture for the locking mode and the locking jaw is positioned over the clip hole,
   wherein the locking bracket is rotatably disposed at the rotary mount; the restoring spring elastically supports the locking bracket such that the locking jaw of the locking bracket is positioned at the position where the locking jaw does not prevent separation of the belt clip; and a locking bracket rotation portion rotating the locking bracket such that the locking jaw of the locking bracket is moved to the position where the locking jaw prevents separation of the belt clip when the rotary mount is changed into the posture for the locking mode from the posture for the mounting mode is further provided,
   wherein the locking bracket comprises a locking bracket body having a first side where the locking jaw is formed and another side rotatably coupled to the rotary mount, and a sliding protrusion protruding toward the holder body from the locking bracket body;
   the locking bracket rotation portion is a guide slope formed at the holder body, extending along a movement path of the sliding protrusion when the rotary mount is changed into the posture for the locking mode from the posture for the mounting mode, and protruding at a slope toward the sliding protrusion; and
   the sliding protrusion of the locking bracket keeps in contact with the guide slope by the restoring spring.

2. The belt holder of claim 1, wherein a locking bracket hole for inward and outward movement of the locking bracket is formed over the clip hole of the rotary mount; and
   the locking bracket is positioned inside the rotary mount without protruding outward in the mounting mode, and the locking jaw of the locking bracket protrudes through the locking bracket hole and is positioned over the clip hole in the locking mode.

3. The belt holder of claim 1, wherein a pair of clip fixing plate springs for holding and fixing left and right sides of the belt clip inserted in the clip hole are further disposed in the rotary mount.

4. A belt holder for a tape measure which is mounted on a belt to hold the tape measure having a belt clip by hanging the tape measure, the belt holder comprising:
   a holder body configured to be mounted on the belt;

a rotary mount having a clip hole formed in an up-down direction in which the belt clip of the tape measure is inserted to hang the tape measure, rotatably coupled to a front surface of the holder body, and being able to change into a posture for a mounting mode in which the rotary mount is vertically upright with respect to the holder body and a posture for a locking mode in which the rotary mount is rotated from the posture for the mounting mode;

a locking bracket having a locking jaw preventing separation of the belt clip from the clip hole, and provided at the holder body or the rotary mount such that the locking jaw can reciprocate between a position where the locking jaw prevents separation of the belt clip and a position where the locking jaw does not prevent separation of the belt clip; and a restoring spring elastically supporting the locking bracket in one direction such that the locking jaw of the locking bracket is positioned at the position where the locking jaw prevents separation of the belt clip or the position where the locking jaw does not prevent separation of the belt clip, wherein the belt holder can be used in the mounting mode in which the rotary mount is in the posture for the mounting mode and the belt clip of the tape measure can be inserted into the clip hole or can be freely taken out of the clip hole and in the locking mode in which the rotary mount is in the posture for the locking mode and the locking jaw is positioned over the clip hole, wherein the holder body and the rotary mount are combined to be able to rotate about a rotary shaft positioned at centers of the holder body and the rotary mount;

the rotary mount comprises a posture-fixing plate spring having an end fixed to the rotary mount and another end where a locking protrusion is formed; and the holder body comprises a posture-fixing plate spring stopper formed in cylindrical shape surrounding the rotary shaft and having, on an outer surface thereof, a first locking groove in which the locking protrusion is inserted to elastically fix the rotary mount to the holder body when the rotary mount is in the posture for the mounting mode, a second locking groove in which the locking protrusion is inserted to elastically fix the rotary mount to the holder body when the rotary mount is in the posture for the locking mode, and a locking protrusion guide surface extending between the first locking groove and the second locking groove to guide movement of the locking protrusion.

5. The belt holder of claim 4, wherein a first anti-rotation step restricting movement of the locking protrusion is formed opposite to the locking protrusion guide surface of the first locking groove, and a second anti-rotation step restricting movement of the locking protrusion is formed opposite to the locking protrusion guide surface of the second locking groove.

6. A belt holder for a tape measure which is mounted on a belt to hold the tape measure having a belt clip by hanging the tape measure, the belt holder comprising:

a holder body configured to be mounted on the belt;

a rotary mount having a clip hole formed in an up-down direction in which the belt clip of the tape measure is inserted to hang the tape measure, rotatably coupled to a front surface of the holder body, and being able to change into a posture for a mounting mode in which the rotary mount is vertically upright with respect to the holder body and a posture for a locking mode in which the rotary mount is rotated from the posture for the mounting mode;

a locking bracket having a locking jaw preventing separation of the belt clip from the clip hole, and provided at the holder body or the rotary mount such that the locking jaw can reciprocate between a position where the locking jaw prevents separation of the belt clip and a position where the locking jaw does not prevent separation of the belt clip; and a restoring spring elastically supporting the locking bracket in one direction such that the locking jaw of the locking bracket is positioned at the position where the locking jaw prevents separation of the belt clip or the position where the locking jaw does not prevent separation of the belt clip, wherein the belt holder can be used in the mounting mode in which the rotary mount is in the posture for the mounting mode and the belt clip of the tape measure can be inserted into the clip hole or can be freely taken out of the clip hole and in the locking mode in which the rotary mount is in the posture for the locking mode and the locking jaw is positioned over the clip hole, wherein any one of the holder body and the rotary mount has a spring protrusion and the other one of the holder body and the rotary mount has a plurality of protrusion grooves in which the spring protrusion is inserted to elastically fix the rotary mount in the posture for the mounting mode or the posture for the locking mode.

* * * * *